(12) United States Patent
D'Egidio

(10) Patent No.: US 9,505,126 B2
(45) Date of Patent: Nov. 29, 2016

(54) DEVICE FOR THE MOVEMENT AND POSITIONING OF AN ELEMENT IN SPACE

(71) Applicant: Michele D'Egidio, Branchburg, NJ (US)

(72) Inventor: Michele D'Egidio, Branchburg, NJ (US)

( * ) Notice: Subject to any disclaimer, the term of this patent is extended or adjusted under 35 U.S.C. 154(b) by 262 days.

(21) Appl. No.: 14/524,316

(22) Filed: Oct. 27, 2014

(65) Prior Publication Data

US 2016/0114481 A1    Apr. 28, 2016

(51) Int. Cl.
| | |
|---|---|
| B25J 17/02 | (2006.01) |
| B25J 9/10 | (2006.01) |
| B25J 9/16 | (2006.01) |
| B25J 9/00 | (2006.01) |

(52) U.S. Cl.
CPC ............ *B25J 9/1065* (2013.01); *B25J 9/0051* (2013.01); *B25J 9/1623* (2013.01); *B25J 17/0266* (2013.01); *Y10S 901/02* (2013.01); *Y10S 901/14* (2013.01); *Y10S 901/19* (2013.01)

(58) Field of Classification Search
CPC ........ B25J 9/0048; B25J 9/0051; B25J 9/02; B25J 9/048; B25J 9/06; B25J 9/10; B25J 11/00; B25J 11/005; B25J 17/02; B25J 17/0266; B25J 17/0283; B25J 18/00; B25J 18/04; Y10S 901/24; Y10T 74/20317; Y10T 74/20329; Y10T 74/20335
USPC ............. 74/490.05, 490.06; 414/589; 901/29
See application file for complete search history.

(56) References Cited

U.S. PATENT DOCUMENTS

| | | | |
|---|---|---|---|
| 2,878,678 A | 3/1959 | Hurlburt | |
| 3,473,391 A | 10/1969 | Williamson et al. | |
| 4,129,270 A | 12/1978 | Robinson et al. | |
| 4,140,226 A | 2/1979 | Richter | |
| 4,455,120 A | 6/1984 | Richter | |
| 4,645,084 A | 2/1987 | Deike | |
| 4,710,092 A | 12/1987 | Skoog et al. | |
| 4,976,582 A | 12/1990 | Clavel | |
| 6,286,386 B1 | 9/2001 | Spletzer et al. | |
| 7,188,544 B2 | 3/2007 | Persson et al. | |
| 8,210,068 B2 * | 7/2012 | Feng | ............... B25J 17/0266 74/490.05 |
| 8,307,732 B2 | 11/2012 | Kinoshita et al. | |
| 8,516,919 B2 | 8/2013 | Feng | |
| 8,621,953 B2 | 1/2014 | Hombach et al. | |
| 8,714,903 B2 | 5/2014 | Feng | |
| 8,798,450 B2 | 8/2014 | Aicher et al. | |
| 2012/0067354 A1 | 3/2012 | Lammertse | |
| 2014/0083231 A1 | 3/2014 | Sutherland | |
| 2014/0207283 A1 | 7/2014 | Kuhmichel | |

FOREIGN PATENT DOCUMENTS

JP    3333874 B2 *  10/2002    ............... B25J 3/00

\* cited by examiner

*Primary Examiner* — Michael McCullough
*Assistant Examiner* — Brendan Tighe
(74) *Attorney, Agent, or Firm* — Caesar Rivise, PC

(57) ABSTRACT

An industrial robot includes a parallel kinematics mechanism that provides three degrees of freedom to a ring structure while maintaining the ring structure substantially in a fixed orientation relative to a reference plane established by a stationary base plate. A pivot sleeve is suspended within the stationary base plate and may pivot on two perpendicular axes of an intermediate gimbal. An elongate boom is mounted within the pivot sleeve and extends from an upper end through the pivot sleeve to a lower end. An end effector is mounted at the lower end of the elongate boom and is arranged for carrying a work element. Gimbal rings are located at the upper and lower ends of the elongate boom and are interconnected by a control linkage to maintain the end effector substantially parallel to the ring structure during movement of the end effector through a three-dimensional work envelope.

2 Claims, 11 Drawing Sheets

DEVICE FOR THE MOVEMENT AND POSITIONING OF AN ELEMENT IN SPACE

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates to robotic technologies, and more particularly to a robot for use in industrial processes including pick-and-place operations having the advantages of mechanical amplification, stability, load-bearability, and improved dynamic characteristics.

BACKGROUND OF THE INVENTION

The use of industrial robots for the flexible automation of industrial processes has become increasingly common for replacing time consuming, monotonous and difficult work. Such work can, for example, be transferring confectionary products such as chocolate or similar fragile or small objects from a conveyor belt to places in predetermined locations in, for example, boxes, with high speed and precision where the object is moving on a separate conveyor belt. The ability to be able to handle small and delicate objects effectively with great speed and precision is much sought after in the automation of industrial processes.

Delta type robots (also known as parallel robots) have applications in diverse industries, for example in the food industry and the pharmaceutical industry. The delta robot was first developed in 1985 by R. Clavel and is described in U.S. Pat. No. 4,976,582 (Clavel). Delta robots have proven their worth in particular for packaging lightweight foods, since they permit extremely high speed and high accuracy for performing pick-and-place applications, such as may be effectively used in the packaging machine industry, for picking products from a conveyor belt and placing them in cartons. Delta robots are typically parallel robots with three degrees of freedom (3 DoF), and with simpler, more compact structure and favorable dynamic characteristics.

The delta robot is a parallel robot, i.e. it consists of multiple kinematic chains, e.g., middle-jointed arms connecting a base with the end-effector. The key concept of the delta robot is the use of parallelograms which restrict the movement of the platform on which the end-effector is mounted to pure translation, i.e. only movement in the X, Y or Z direction with no rotation. The robot's base is mounted above the workspace. A plurality of actuators, e.g., three motors, are mounted equidistantly to the base. From the base, three middle-jointed arms extend. The ends of these arms are connected to a small platform. Actuation of the middle-jointed arms will move the platform along the X, Y or Z direction. Actuation can be done with linear or rotational actuators, with or without reductions (direct drive).

Since the actuators are all located in the base, the middle-jointed arms can be made of a light composite material. As a result of this, the moving parts of the delta robot have a small inertia. This allows for very high speed and high accelerations. Having all the arms connected together to the end-effector increases the robot stiffness, but reduces its working volume. Each middle-jointed arm is comprised of an upper arm and a pivotally attached lower arm. Each lower arm is formed of two parallel rods that form a parallelogram. Because the lower arm consists of two parallel rods, the end effector always moves, parallel to the base plate located thereabove. This is also known as parallelogram-based control, or parallel kinematics. Note that at least three sets of the arms are necessary to provide generally translation-only motion of the end effector through three dimensions.

In use, a delta robot may be suspended over a conveyor type system to grasp and move small objects rapidly and with a high rate of precision. The end effector is arranged to support a tool or other device for carrying out a particular function or task. By a swivelling of the actuators, the end effector can be maneuvered in three-dimensional space formed by the X, Y, and Z axes to any desired position of the available work space. In addition, the end effector of the delta robot is usually equipped with visual guidance capability so that objects moving along a conveyor may be identified for picking and placing into cartons, cases, etc.

A fast movement over a relatively great distance, namely the width of the conveyor belt, requires a fast movement of several arms. This is possible in practice only if the robot arms have a low mass inertia, which in the case of delta robots is achieved through the use of light-weight materials, so that the mass inertia of the delta robot is minimized. However, the use of light-weight materials in the construction of the delta robot considerably restricts the load to which the delta robot can be subjected, which means that the delta robot can be used only for gripping light objects with a light gripper. For this reason, its useability and practical application is limited. Use of more robust parts and components would provide capability for gripping heavier objects, however such a benefit comes at the cost of a reduction in speed due to higher mass inertia. Also, light-weight materials used in the construction of delta robots tend to be less robust and cannot provide continuous production cycle times, e.g., 24-hour cycle times. Also, many light-weight materials cannot provide the benefits of low maintenance and infrequent repair as more robust parts and components that are utilized in other types of industrial machinery.

Generally, in the foodstuffs industry or in pharmaceutical applications, it is important that components of the delta robots be capable of being cleaned easily. For example, delta robots may include many parts, e.g., arms, located in proximity to the foodstuffs such as raw chicken parts being conveyed. During operation, these parts cannot be shielded from the chicken parts, making wash-down and clean-up of a delta robot a time consuming and expensive task. It would be an improvement within the art to provide an industrial robot where parts and components can be shielded from the foods or other materials that are being picked and placed to reduce or eliminate such wash-down and clean-up requirements.

Also, in many industrial processes, such as in pick-and-place operations, it is important for robots to exhibit superior range of motion in all directions. Because of its overall design, the end effector of a traditional delta robot has a limited range of motion, in that the end effector does not benefit from any mechanical amplification of movement.

Further, superior range of motion in the Z-axis direction is critical for picking products from a conveyor belt and placing them into deep cartons or cases for shipping. As a result of the design of the pivotable arms of the delta robot which extend laterally as they move through their range of motion, often the laterally-extending arms will interfere with placement of products into cartons or cases to such depths. Also, with the delta robot, to obtain incremental increases in range of motion in the Z-axis direction, it is necessary to increase the length of the arms considerably, which adds weight and reduces production cycle time.

For the foregoing reasons, there is room for improvement within the art.

SUMMARY OF THE INVENTION

An industrial robot includes a parallel kinematics mechanism that provides three degrees of freedom to a ring structure while maintaining the ring structure substantially in a fixed orientation relative to a reference plane established by a stationary base plate. A pivot sleeve is suspended within the stationary base plate and may pivot on two perpendicular axes of an intermediate gimbal. An elongate boom is mounted within the pivot sleeve and extends from an upper end through the pivot sleeve to a lower end. An end effector is mounted at the lower end of the elongate boom and is arranged for carrying a work element. Gimbal rings are located at the upper and lower ends of the elongate boom and are interconnected by a control linkage to maintain the end effector substantially parallel to the ring structure during movement of the end effector through a three-dimensional work envelope.

DETAILED DESCRIPTION OF THE PREFERRED EMBODIMENT

Figure 1:
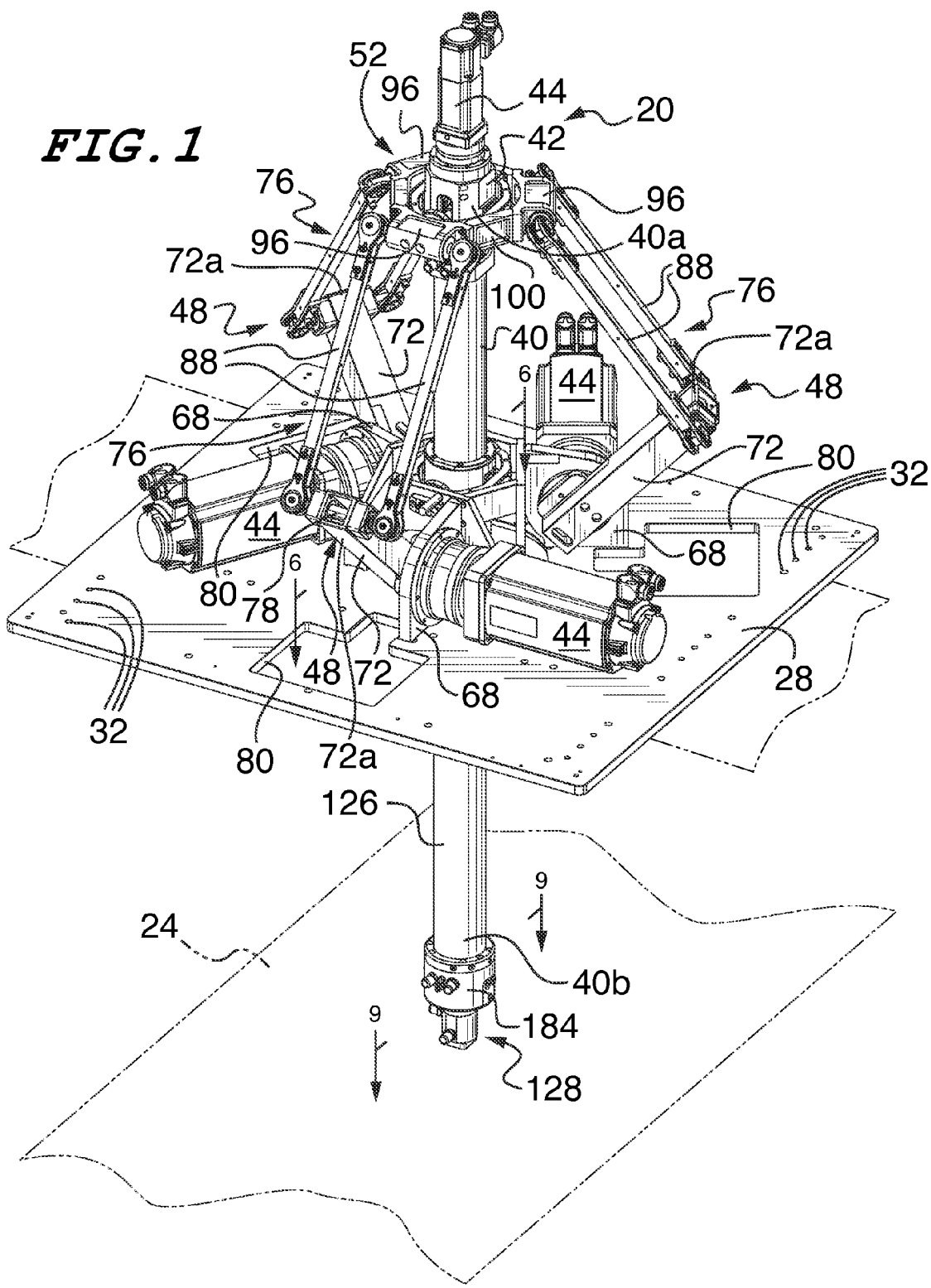
FIG. 1 is a perspective view of an embodiment of the industrial robot of the present invention positioned over a conveyor illustrated in phantom.

Referring now in greater detail to the drawings in which like numerals represent like components throughout the several views, there is shown in FIGS. 1 through 7 an embodiment of the industrial robot of the present invention which is broadly designated by the numeral 20. In this application, the robot 20 is shown positioned in proximity to a conveyor belt 24 and in this application pick objects (oriented or disoriented) from the belt 24 and places them onto trays or into cartons (not shown) for shipping. It should be understood that use of the industrial robot 20 in this high-speed pick-and-place application is merely exemplary and the robot 20 of the present invention could be utilized for other highs-speed applications such as assembly, and pharmaceutical and medical applications. As best shown in FIGS. 1-7, the industrial robot 20 includes a stationary base plate 28 that includes a plurality of through holes 32 for mounting, e.g., bolting, the base plate 28 to a suitable surface (not shown) within a production facility.

Figure 5:
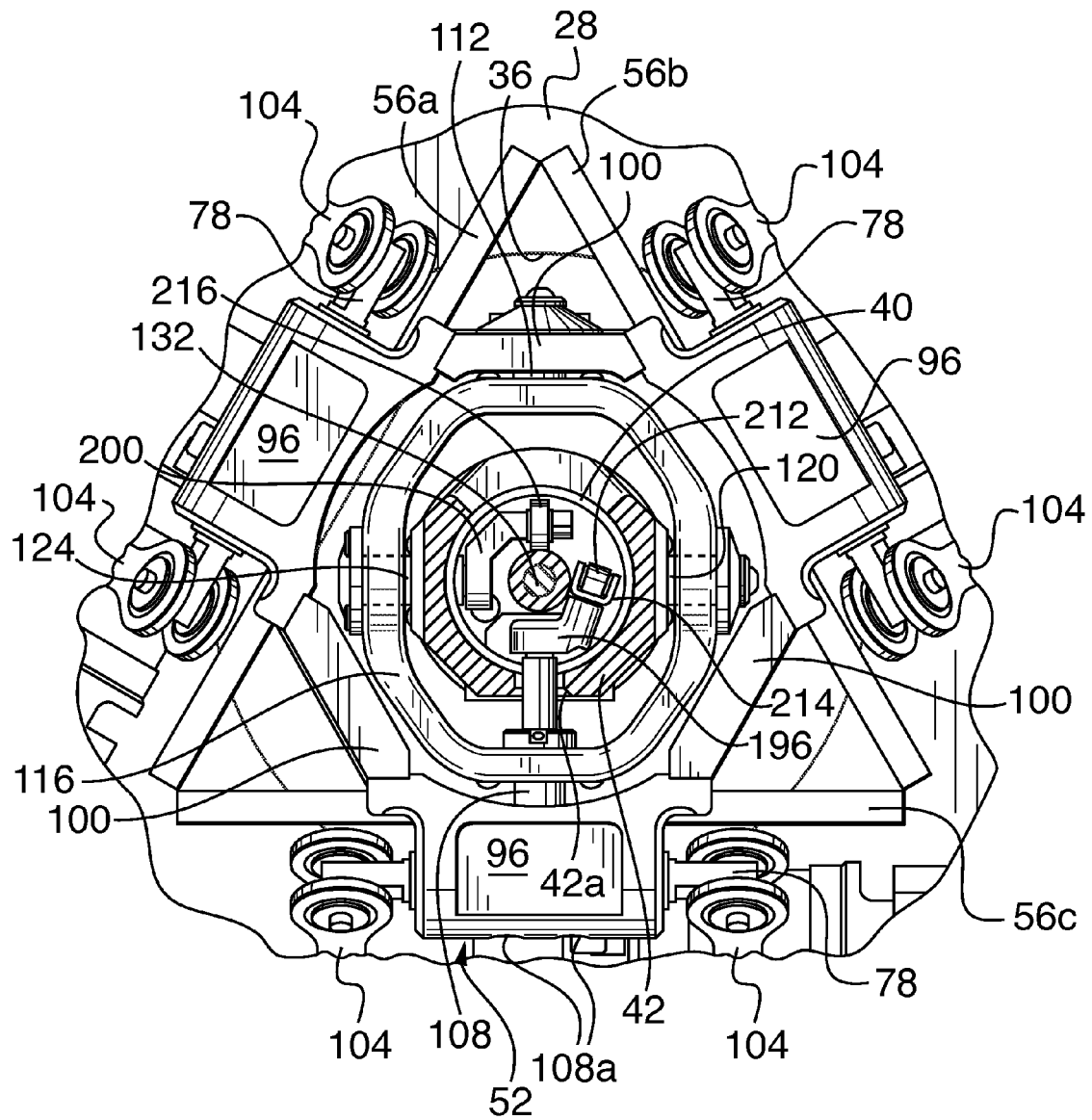
FIG. 5 is an enlarged sectional view taken along line 5-5 of FIG. 4.
Figure 6:
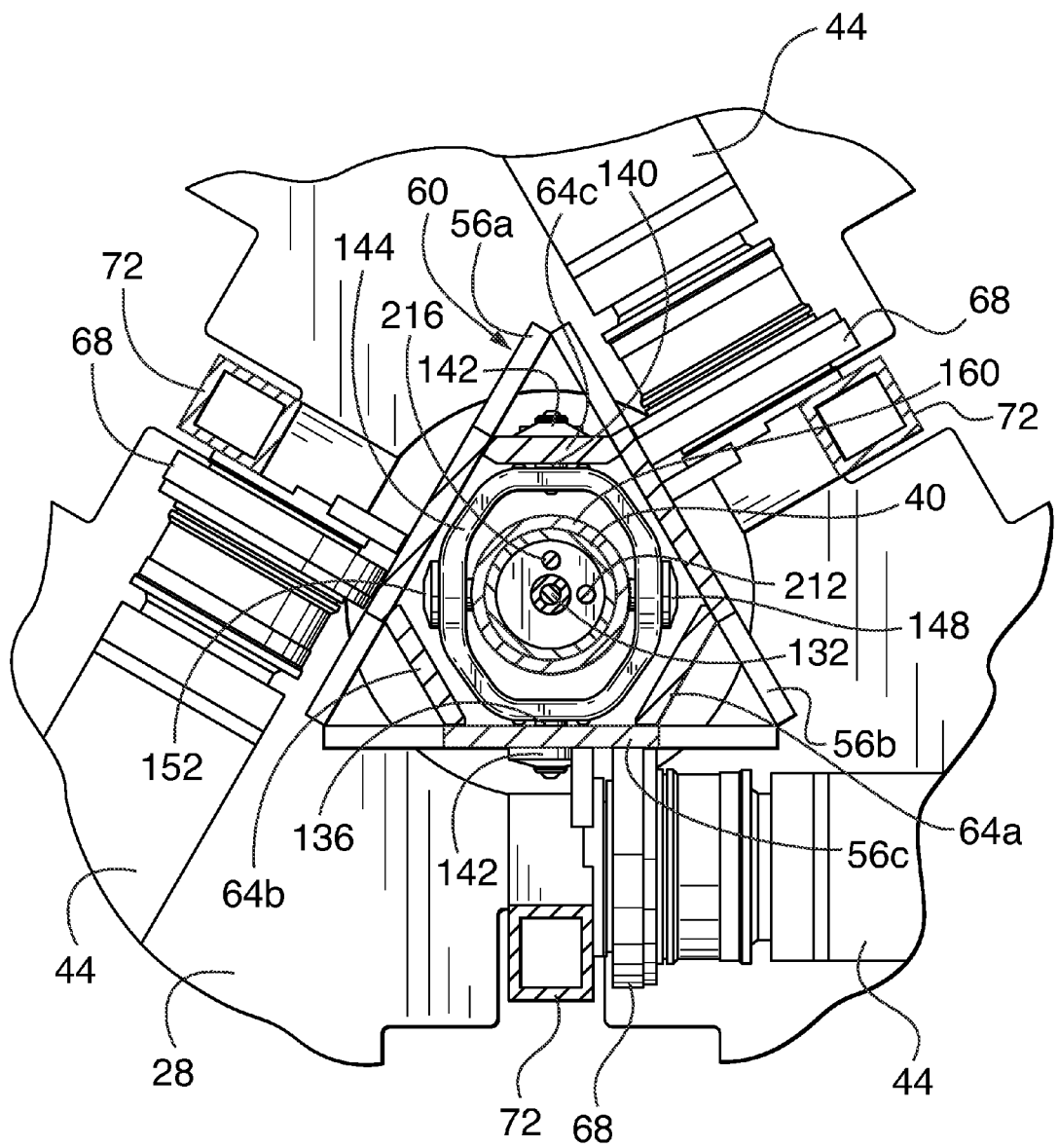
FIG. 6 is an enlarged sectional view taken along line 6-6 of FIG. 1.

As best shown in FIGS. 1, 5 and 6, the base plate 28 is generally rectangular in shape and includes a central opening 36 through which a boom 40 extends. A parallel kinematics structure is mounted to the base plate 28 to surround the central opening 36. The parallel kinematics structure includes actuators 44 mounted to the base plate 28 and control arms 48 extending upwardly from the actuators 44. The control arms 48 include parallelogram shaped links 76 to restrict movement of an upper outer ring 52 to pure translation, i.e. only movement in the X, Y or Z direction with no rotation. The parallel kinematics structure may be similar in construction to a delta robot. However, the invention contemplates parallel kinematics structures of other constructions.

As best shown in FIG. 6, the base plate 28 includes a plurality of upstanding flanges 56a, 56b, and 56c bolted or welded thereto which together form a triangle-shaped structure 60 having welded reinforcement segments 64a, 64b, and 64c situated over the central opening 36. Extending radially from the triangular structure 60 is a plurality of mounting flanges 68 which are attached to the base plate 28 by any suitable means, e.g., welding. The plurality of actuators 44 are mounted to the mounting flanges 68, the mounting flanges 68 utilizing any suitable hardware, e.g., bolts. Each actuator 44 serves as a drive source for a control arm 48 linked thereto. As best shown in FIG. 1, each control arm 48 includes a drive link 72 pivotably linked to a parallelogram link 76. In particular, each actuator 44 includes a crank that is rotated for changing the position of the drive link 72 connected to the crank. By this rotation, the tip end 72a of the drive link 72 moves upward and can move downward through one of a plurality of T-shaped clearance openings 80 located in the base plate 28. In the description below, the "drive link 72 rotates upward" indicates that the drive link 72 rotates so that the tip end 72a moves upward, and the "drive link 72 rotates downward" indicates that the drive link 72 rotates so that the tip end 72a moves downward.

Figure 4:
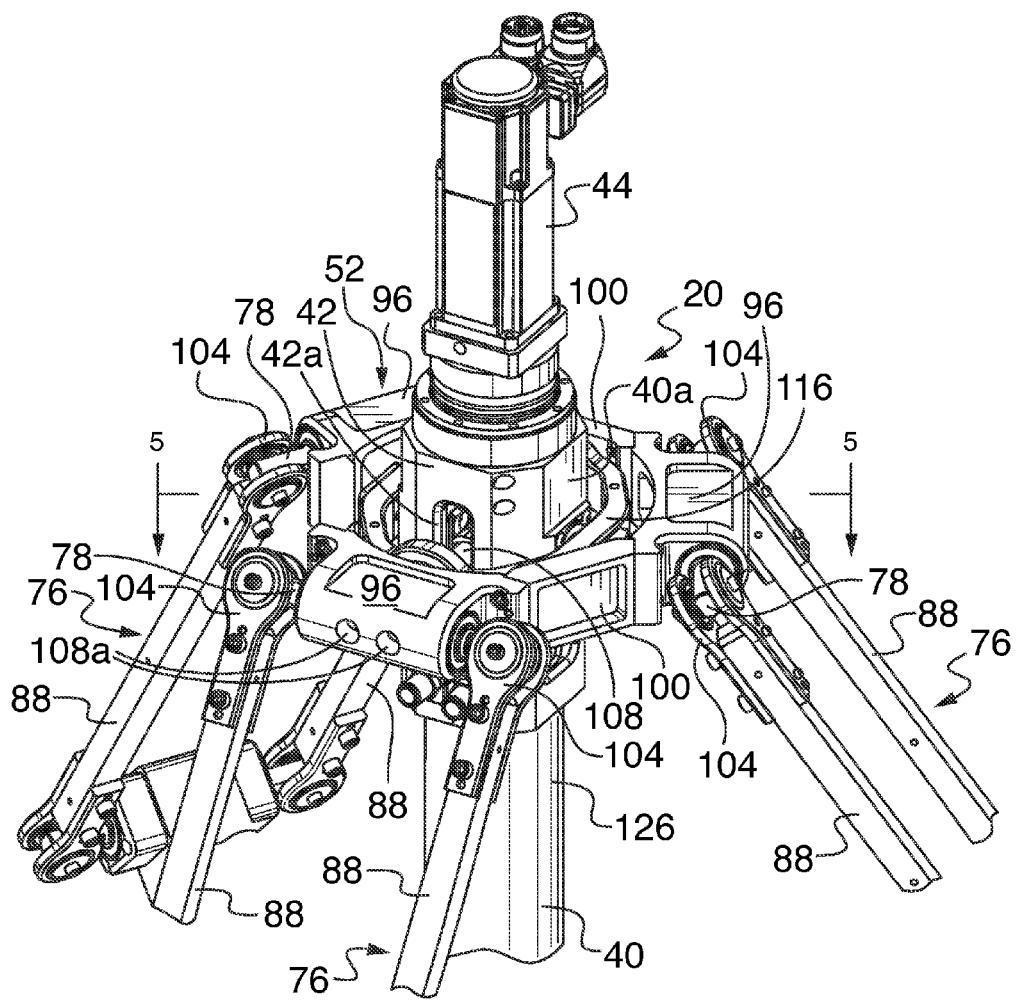
FIG. 4 is an enlarged perspective view of a top portion of the preferred embodiment of the industrial robot of the present invention.

As best shown in FIG. 1, at the tip end 76 of each drive link 72, through holes are provided in which a rotatable swivel rod 78 having flattened ends is located. Each drive link 72 is pivotally connected, e.g., bolted, to a corresponding parallelogram link 76, which is a link driven by the drive link. Referring now to FIGS. 1 and 4, each parallelogram link 76 includes two bar-shaped members 88 that extend substantially vertically and parallel to each other between the drive link 72 and an upper outer ring 52. As best shown in FIG. 4, the upper outer ring 52 includes a plurality of housings 96, each housing 96 provided to house a swivel rod 78 therein, the swivel rod 78 including flattened ends rotatably mounted therein. The housings 96, e.g., three housings, are connected to each other by bolting or other suitable means through connector elements 100. Together, the housings 96 and connector segments 100 form the upper outer ring 52, which is generally hexagonal in shape. Paddle-shaped connectors 104 are fastened to the upper and lower ends of each bar shaped member 88, by any suitable means, e.g., bolting. With the paddle-shaped connectors fastened at opposite ends of each bar member 88, at their upper ends, the bar members 88 may be fastened, e.g., bolted, to the swivel rod 78 located within each housing 96. At their lower ends, the bar members 88 may be fastened, e.g., bolted, to the swivel rod 78 located at the tip end 76 of each drive link 72. Together, the substantially parallel bar members 88 and substantially parallel swivel rods 78 form the parallelogram shape of the parallelogram links 76. By connecting the upper ends of at least two of the parallelogram links 76 to the upper outer ring 52, movement of the upper outer ring 52 is restricted to purely translational movement (movement only with 3 degrees of freedom; translation in the X, Y or Z direction). In this manner, the upper outer ring 52 remains in a fixed orientation, whatever the motion of the control arms 48 may be. The plurality of control arms 48 are movable in different positions between a fully raised position and a fully lowered position relative to the base plate 28 and relative to each other to move the upper outer ring 52 to different elevational and horizontal positions within three-dimensional space while maintaining the upper outer ring 52 substantially in a fixed orientation.

Figure 8:
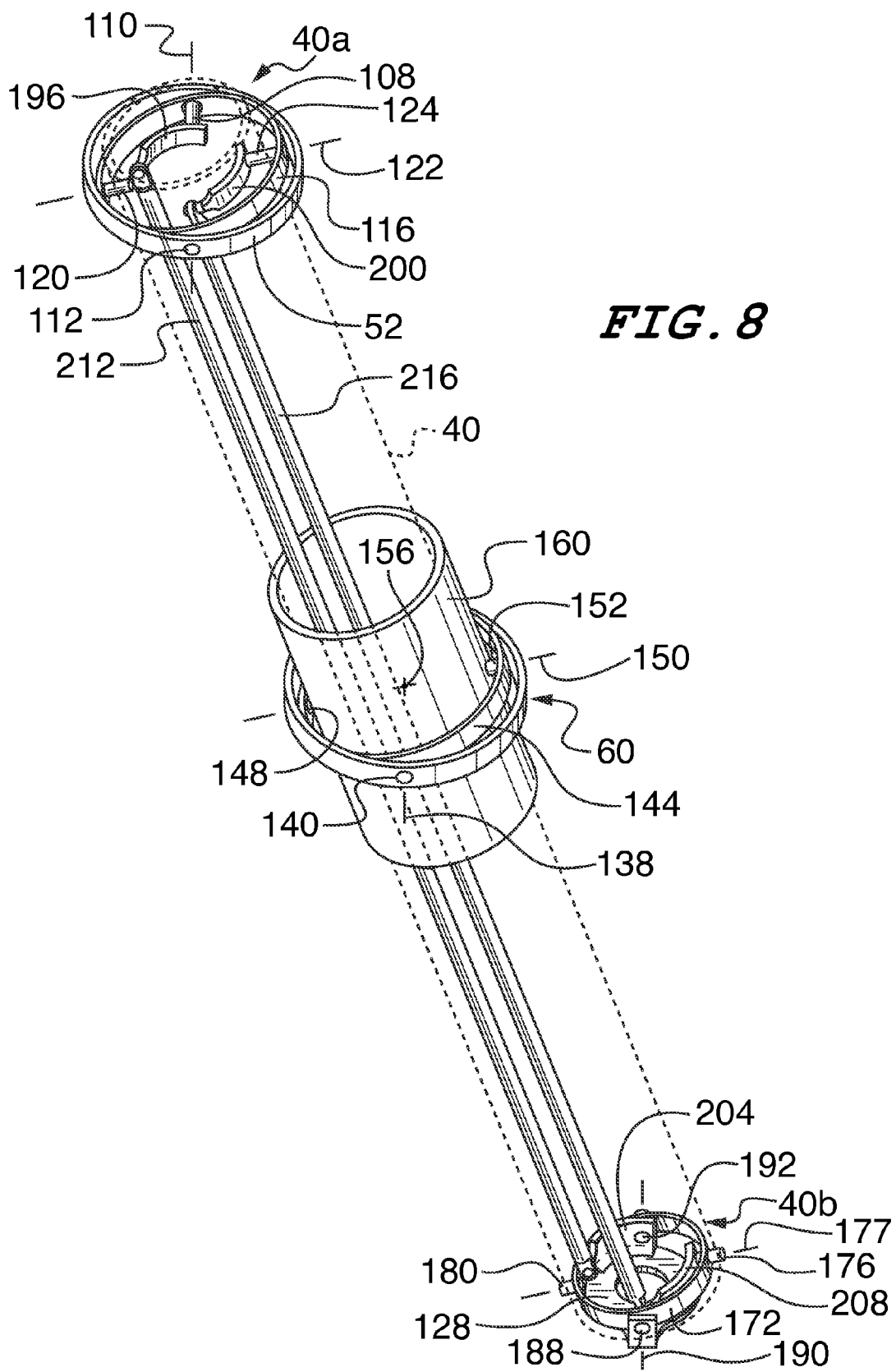
FIG. 8 is a schematic view illustrating the internal linkages that hold the end effector in a fixed orientation.

Referring now to FIGS. 4, 5 and 8, the upper outer ring 52 includes two axle segments 108 and 112 located on opposite ends of the upper outer ring's periphery. The axles 108 and 112 are attached to the upper outer ring 52 by any suitable means, e.g., bolts 108a in FIG. 4. The axle segments 108 and 112 are coaxial and extend inwardly from the periphery of the upper outer ring 52 to form a first upper axis 110. As best shown in FIGS. 4 and 5, the axle 108 passes through a slot 42a in the housing 42. An upper gimbal ring 116 is rotatably mounted on these axle segments 108 and 112. As shown in FIG. 5, the upper gimbal ring 116 is octagonal in shape, however, other shapes could be utilized within the scope of the invention. Likewise, the upper gimbal ring 116 includes two axle segments 120 and 124 located on opposite ends of the upper gimbal ring's outer periphery. The axle segments 120 and 124 lie along a second upper axis 122 and extend inwardly from the periphery of the upper gimbal ring 116. The axle segments of the upper gimbal ring 116 are oriented at 90 degrees with respect to the axle segments 108 and 112 of the upper outer ring 52. At its upper end, the boom 40 includes an octagonal-shaped housing 42 (best shown in FIGS. 4 and 5). This housing 42 of the boom 40 is mounted on the axle segments 120 and 124 of the upper gimbal ring 116. In this manner, movement of the boom 40 remains independent of translational movement of the upper outer ring 52 in the X, Y and Z directions.

As best shown in FIGS. 1 and 4, an actuator 44 is attached to the boom 40 above the housing 42. Attached at the bottom of the housing 42, the boom 40 includes a generally cylindrical portion 126 that extends downwardly and below the upper gimbal ring 116. Thereafter, the cylindrical portion 126 extends through the central opening 36 in the base plate 28 to a distal end 40b where an end effector 128 is located.

As best shown in FIG. 6, a rotation shaft 132 extends centrally within the boom 40 to connect the actuator 44 attached above thehousing 42 with a tool (not shown) mounted to the end effector 128. The rotation shaft 132 provides unlimited rotational capability to a tool (not shown) mounted to the end effector 128.

Referring now to FIGS. 1, 5, 6, and 8, the central opening 36 of the base plate 28 acts as a middle pivot point for pivotal movement of the boom 40 therein. Specifically, an axle segment 136 is provided approximately midway along the length of upstanding flange 56c and an opposing axle segment 140 is provide approximately midway along the length of the bolted reinforcement section 64c. The opposing axle segments 136 and 140 may be secured to the upstanding flange 56c and to the attached reinforcement section 64c utilizing any suitable hardware, e.g., bolts 142. The axle segments 136 and 140 are coaxial to form a first central axis 138 (FIG. 8). The axle segments extend inwardly from their respective mounting surfaces. A center gimbal ring 144 is provided with mounting holes (not shown) to enable it to be rotatably mounted on the axle segments 136 and 140 within the central opening 36 of the base plate 28. The central opening 36 is sufficiently large to permit rotational movement of the central gimbal ring 144 therein. In this manner, the center gimbal ring 144 is free to rotate about the first central axis 138 formed by axle segments 136 and 140. Likewise, the center gimbal ring 144 is provided with axle segments 148 and 152 mounted in a similar manner thereto. The axle segments 148 and 152 are mounted to the center gimbal ring 144 using any suitable hardware and are located on opposite sides of the periphery of the center gimbal ring 144 and extend inwardly. The axle segments 148 and 152 are oriented at 90 degrees with respect to the axle segments 136 and 140 and define a second central axis 150 (FIG. 8) which is perpendicular to the first central axis 138. The intersection of the first and second central axes defines a mid-pivot point 156 (FIG. 8). A pivot sleeve 160 is mounted to the axle segments 148 and 152 of the center gimbal ring 144 and extends through the center gimbal ring 144. In this manner, the mid-pivot point 156 is located centrally within the pivot sleeve 160 enabling the pivot sleeve 160 to pivot in any direction about the mid-pivot point 156. As best shown in FIG. 6, the boom 40 extends through the pivot sleeve 160. In this manner, the boom 40 is able to pivot about the mid-pivot point 156 in all directions within the central opening 36 of the base plate 28. In addition, the boom 40 is free to slide up and down within the pivot sleeve 160 based upon movement of the control arms 48 from the fully raised to the fully lowered positions.

Figure 2:
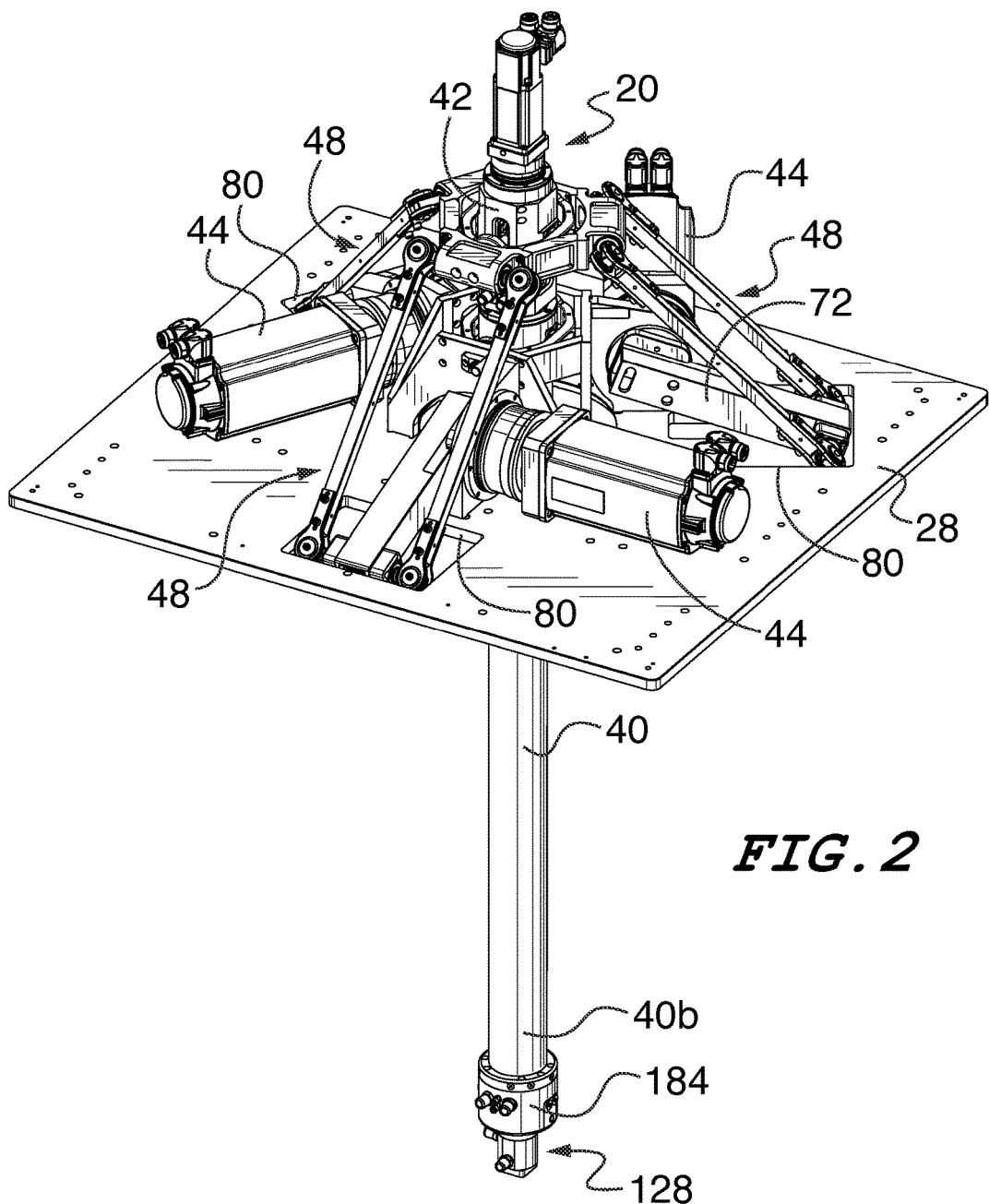
FIG. 2 is a perspective view of the industrial robot of the present invention illustrating the boom in a lowered position.
Figure 3:
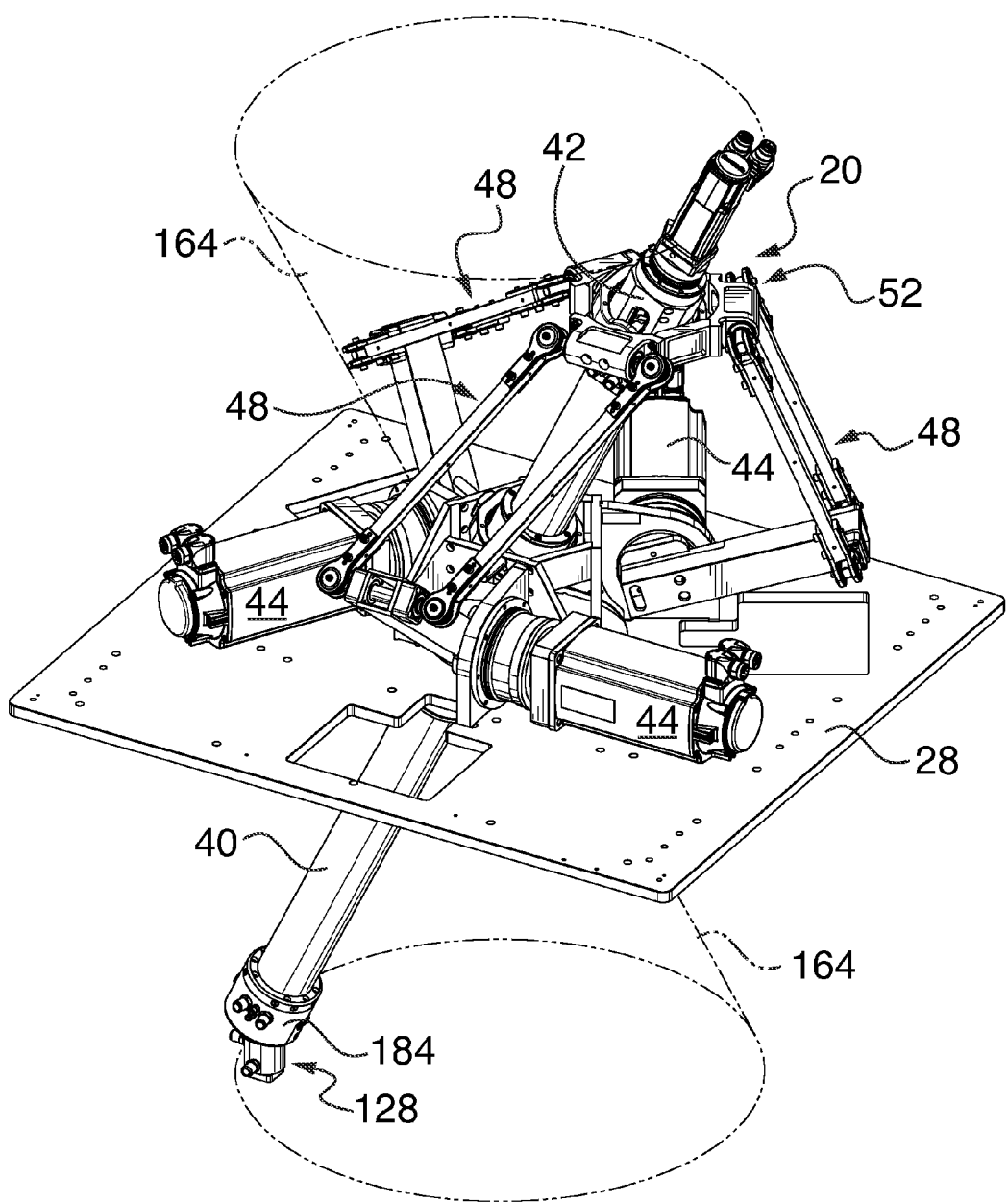
FIG. 3 is a perspective view of the industrial robot of the present invention illustrating the boom in an articulated position.
Figure 7:
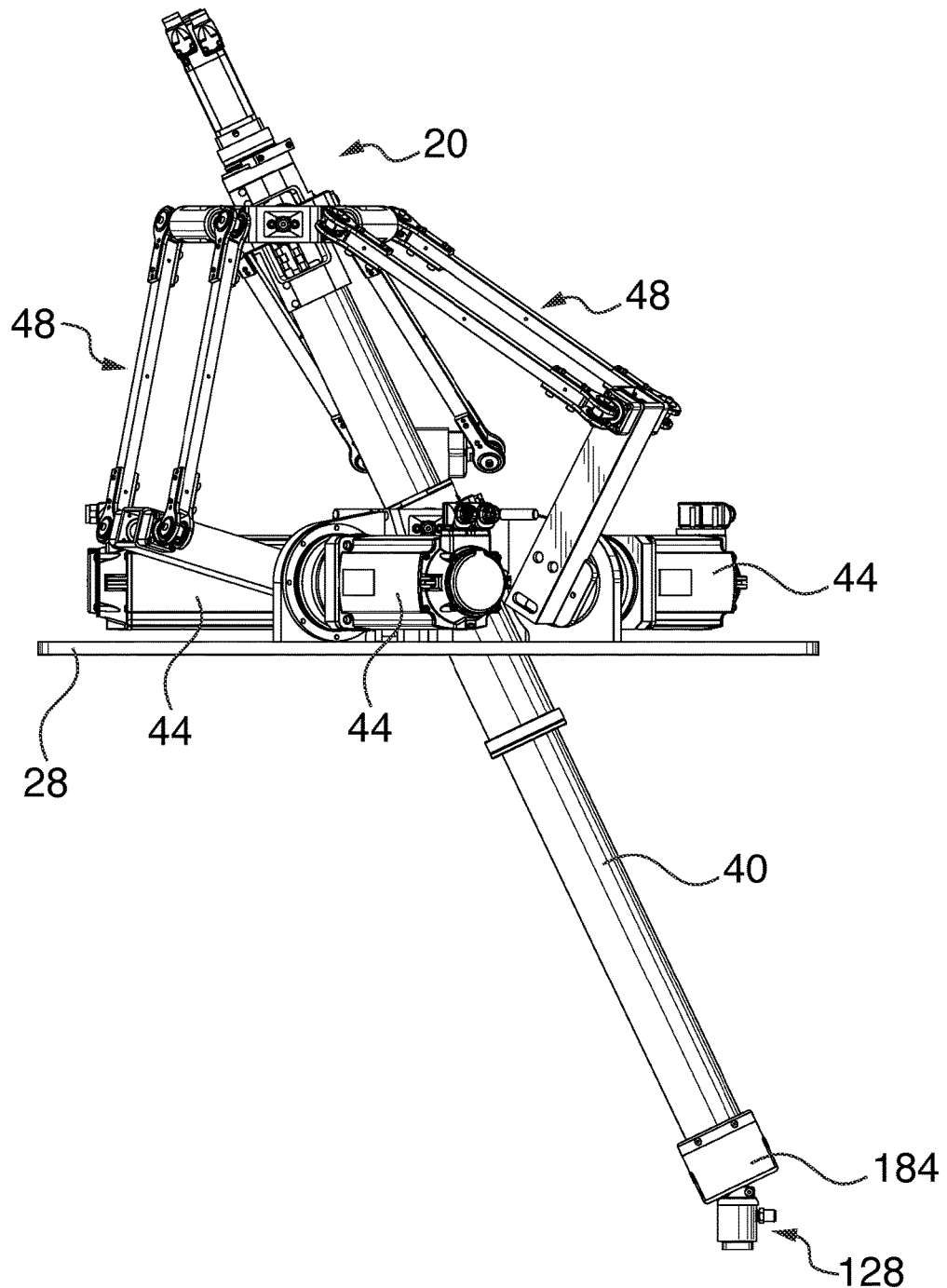
FIG. 7 is a perspective view of the preferred embodiment of the industrial robot of the present invention in another articulated position.

Referring now to FIGS. 2, 3, and 7, the industrial robot 20 of the present invention has a range of motion covering Cartesian X, Y and Z directions such that the end effector 128 located at the distal end 40b of the boom 40 may move transversely and longitudinally within a range of motion defined by a truncated cone indicated at 164. Referring now to FIG. 2, the industrial robot 20 is illustrated therein with each of the control arms 48 in its fully lowered positions, thus causing the end effector 128 to be lowered to its lowest position in the Z direction within the range of motion 164. In particular, the T-shaped clearance openings 80 are provided on the base plate 28 to accept entry of the drive links 72 therein, thus enabling movement of the control arms to a lower position in the Z direction that otherwise would be possible in the absence of the clearance openings 80. Referring now to FIGS. 3 and 7, by moving the control arms 48 to different positions with respect to each other between fully raised and fully lowered, the boom 40 can be maneuvered, e.g., pivoted, in three-dimensional space to any desired articulated position within the available range of motion 164. As illustrated in FIGS. 3 and 7, because each control arm 48 consists of a parallelogram link, the upper outer ring 52 always moves substantially in a fixed orientation relative to the base plate 28 located therebelow. This is also known as parallelogram-based control, or parallel kinematics. The three control arms 48 provide generally translation-only motion to the upper outer ring 52 through three dimensions. It is also shown in FIGS. 1, 3 and 7 that regardless of the position of the upper outer ring 52 in three-dimensional space, the end effector 128, to which a tool (not shown) is mounted, will also exhibit translation-only motion through three dimensions, and remain substantially parallel to the upper outer ring 52. Such translation-only movement of the end effector is critical to use of the industrial robot 20 in the applications discussed above, e.g., pick and place, etc.

Referring now to FIG. 8, there is shown a simplified representation of a portion of the industrial robot 20 of the present invention. The simplified representation includes like numerals to represent like components, where applicable. At this juncture, it is important to mention that the appearance of many components in FIG. 8 may be different than in other figures in that they are simplified and representational only. FIG. 8 is provided to illustrate the manner in which the end effector 128 exhibits translation-only motion through three dimensions, and remains substantially parallel to the upper outer ring 52 regardless of the pivotal movement of the boom 40.

As shown in FIG. 8, and as previously discussed in connection with other figures, the upper end of the boom 40 is rotatably mounted on opposing axle segments 120 and 124 of the upper gimbal ring 116. The upper gimbal ring 116 is rotatably mounted on opposing axle segments 108 and 112 of the upper outer ring 52 which form a first upper axis 110. The opposing axle segments 120 and 124 of the upper gimbal ring 116 are oriented at 90 degrees with respect to the opposing axle segments 108 and 112 of the upper outer ring 52 and form a second upper axis 122. In this manner, movement of the boom 40 remains independent of translational movement of the upper outer ring 52 in the X, Y, and Z directions. The cylindrical boom 40 extends downwardly and through the pivot sleeve 160. As previously discussed, the pivot sleeve 160 is rotatably mounted on opposing axle segments 148 and 152 of the center gimbal ring 144. The center gimbal ring 144 is rotatably mounted to opposing axle segments 136 (not shown in FIG. 8) and 140 which are mounted to the structure represented at 60. First and second central axes are defined at 138 and 150, respectively, in FIG. 8. Thereafter, the boom 40 extends to its distal end 40b where the end effector 128 is located.

Referring again to FIG. 8, a lower gimbal ring 172 is rotatably mounted at the distal end 40b of the boom. In particular, the lower gimbal ring 172 includes opposing axle segments 176 and 180 that extend through openings located at the distal end 40b of the boom 40. An end effector 128 is rotatably mounted to the lower gimbal ring 172. In particular, the end effector 128 includes opposing axle segments 188 and 192 which define a first lower axis 190. Axle segments 188 and 192 are arranged to pass through openings in the lower gimbal ring 172 to enable the end effector 128 to rotate about the first lower axis 190 that is substantially perpendicular to a second lower axis 177 defined by opposed axle segments 176 and 180 of the lower gimbal ring 172. The lower gimbal ring 172 includes an arcuate arm 208 extending arcuately approximately ninety degrees with an attachment point lying on the first lower axis 190. The end effector 128 also includes an arcuate arm 204 that extends arcuately approximately ninety degrees and includes an attachment point lying in the second lower axis 177.

Similarly, the upper outer ring 52 is provided with an arcuate arm 196 that extends to an attachment point lying in the second upper axis 122 and the upper gimbal ring 116 is provided with an arcuate arm 200 that extends to an attachment point lying in the first upper axis 110. A first rigid connecting rod 212 connects at its upper end to the attachment point of the arcuate arm 196 and at its lower end connects with the attachment point of arcuate arm 204. A second rigid connecting rod 216 connects at its upper end to the attachment point of the arcuate arm 200 and at its lower end connects with the arcuate arm 208. The rigid connecting rods 212 and 216 are approximately equal in length. Together, through their connection to the arcuate arms of the upper outer ring 52 and the upper gimbal ring 116, the connecting rods 212 and 216 serve to limit motion of the end effector 128 to translation-only motion through three dimensions. In this manner, the end effector 128 will remain substantially parallel to the upper outer ring 52 regardless of the pivoting motion of the boom 40 to which the end effector 128 is connected.

For example, as best shown in FIG. 8, as the lower end of the boom 40 swings along axis 177 to the right, the boom lower end 40b will pivot out of a plane parallel to the upper outer ring 52. However, because the end effector 128 is pivotally mounted to the lower gimbal ring 172, and connected to the upper outer ring 52 through the rigid connecting rod 212, the end effector 128 will remain parallel to the upper outer ring 52 through this movement.

The actual components forming the upper arcuate arms 196 and 200 can be seen in FIG. 5. The arcuate arm 196 is shown as bending at an angle that is less than 90 degrees and the arcuate arm 200 is shown as including two 45 degree bends. As best shown in FIG. 5, the top end of the rigid connecting rod 212 is housed within a stirrup 214 which is connected to upper arcuate arm 196. The top end of the rigid connecting rod 216 may include a circular eyelet (not shown) including a central opening through which the upper arcuate arm 200 may extend to connect these components.

Figure 9:
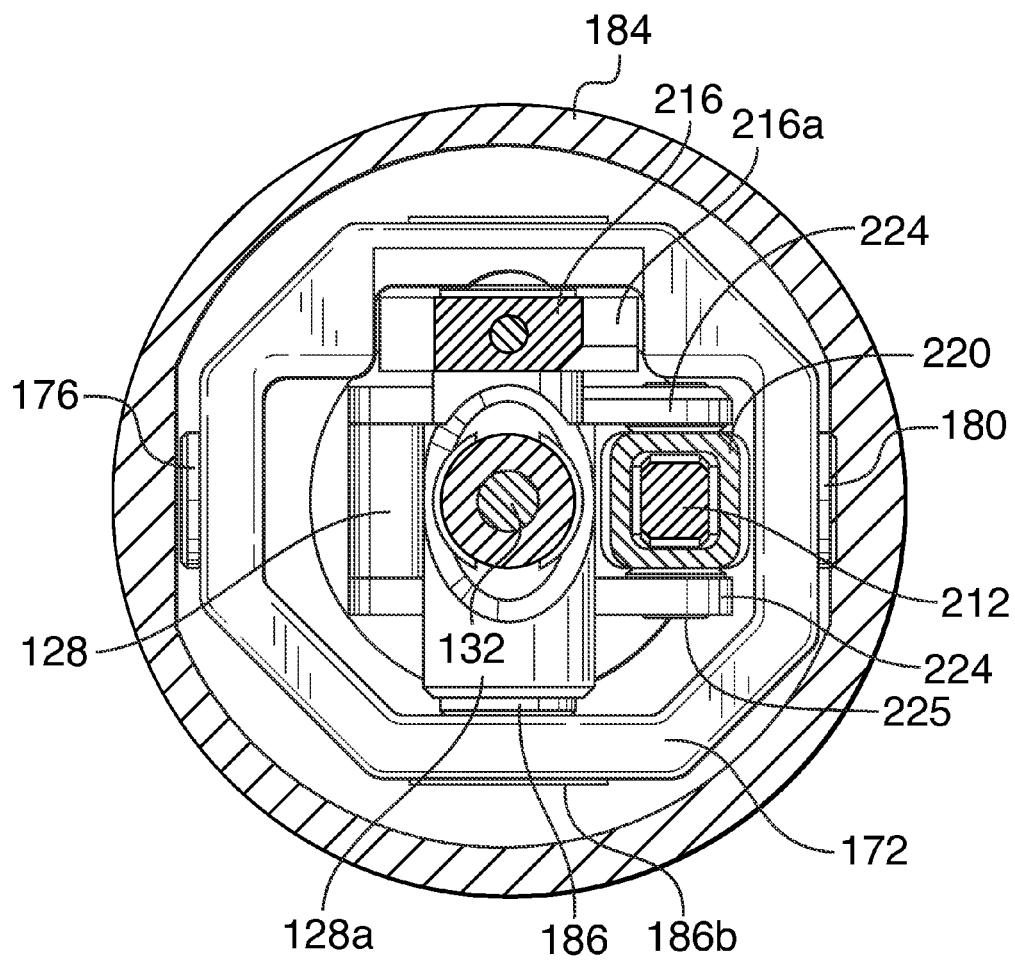
FIG. 9 is an enlarged sectional view taken along line 9-9 of FIG. 1.
Figure 10:
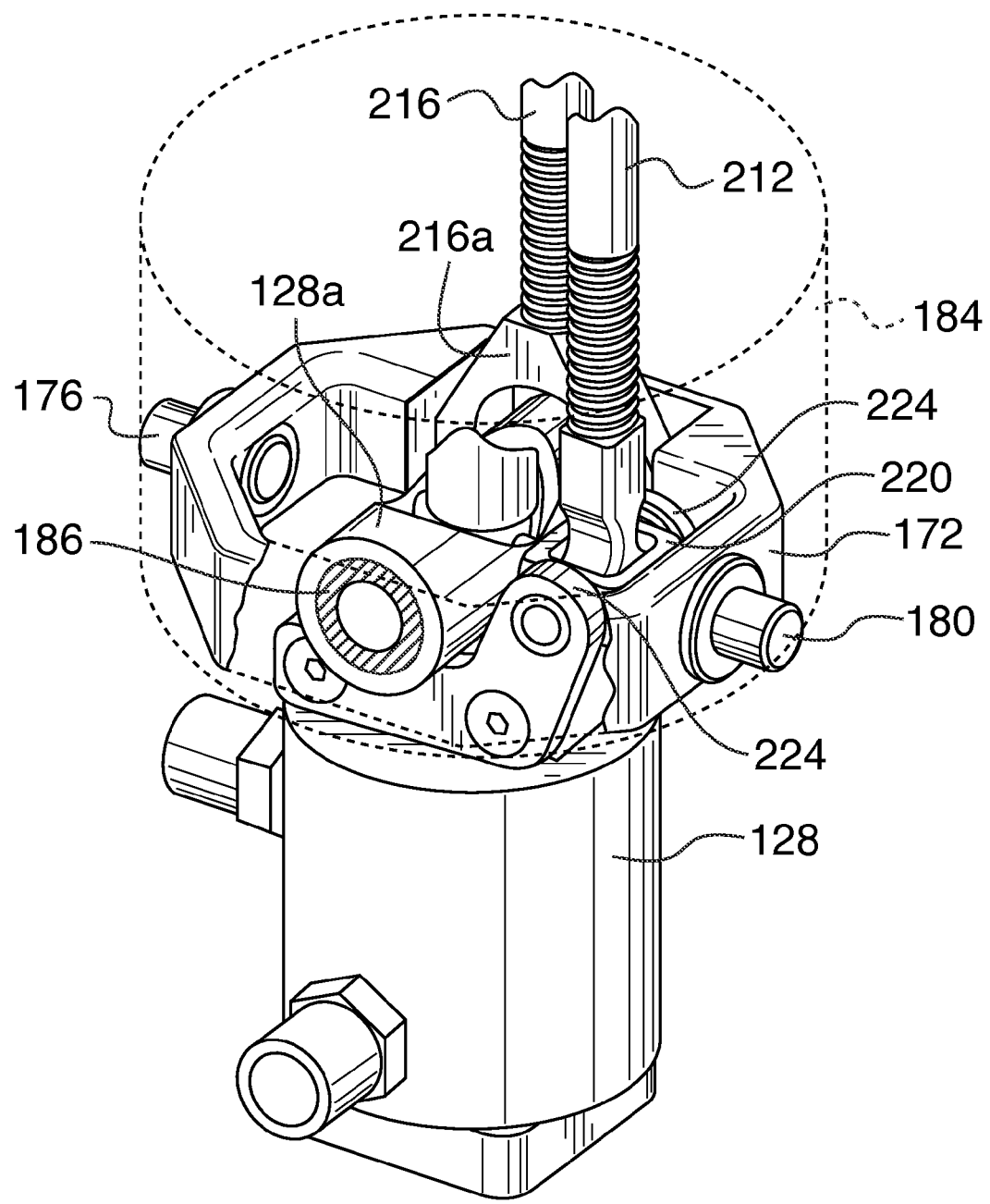
FIG. 10 is an enlarged perspective view of the end effector portion of the preferred embodiment of the industrial robot of the present invention; and, FIG. 11 is an enlarged perspective view of the end effector portion of the preferred embodiment of the industrial robot of the present invention when the robot is in an articulated position.
Figure 11:
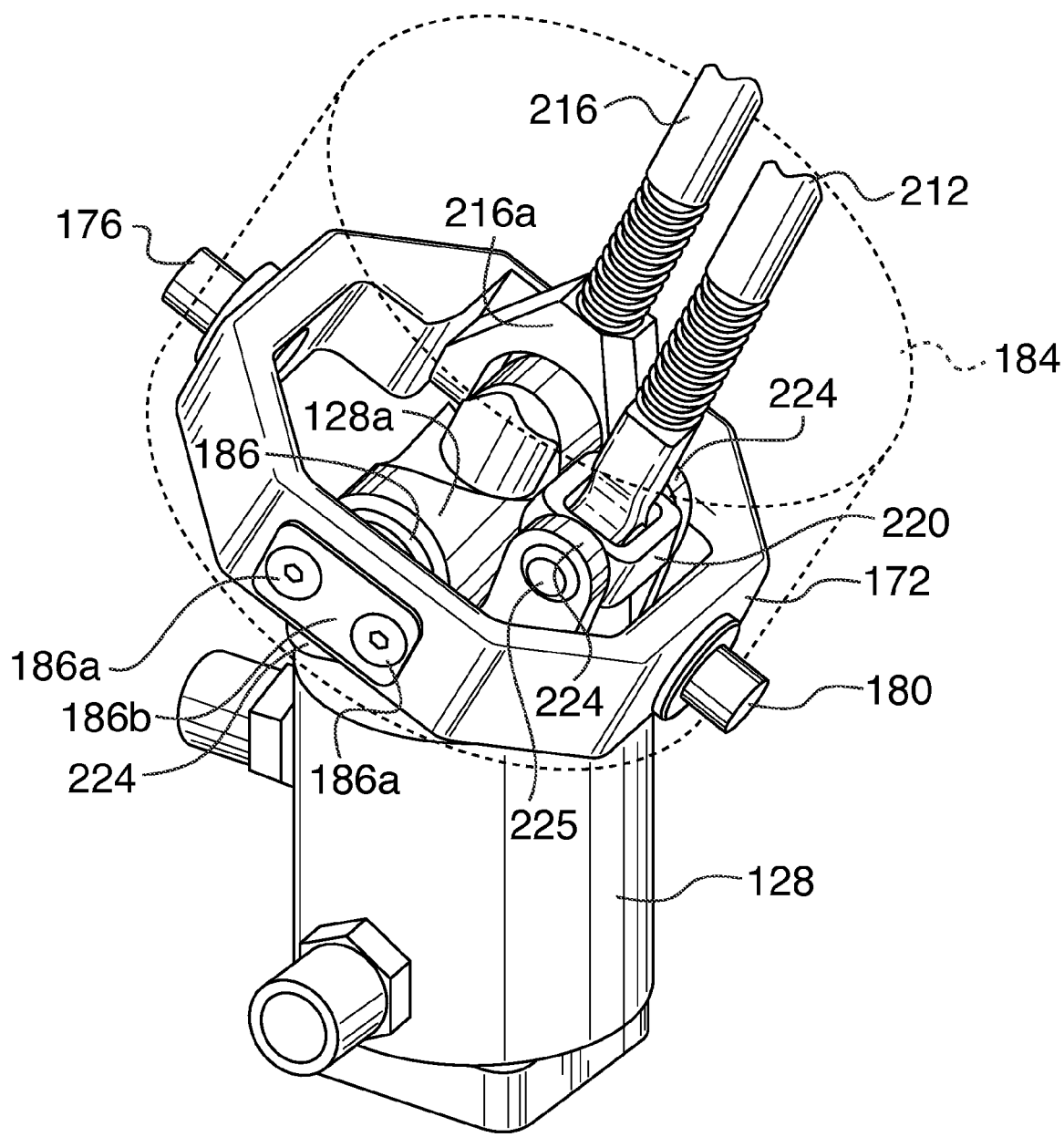

Referring now to FIGS. 9-11, the actual components relating to operation of the end effector 128 are illustrated. In particular, the end effector 128 includes a housing 184 which attaches at the distal end 40b of the boom (FIG. 1). A lower gimbal ring 172 has an outer surface that is generally octagonal in shape. The lower gimbal ring 172 includes opposing axle segments 176 and 180 that extend outwardly. The lower gimbal ring 172 is shown as rotatably mounted within the housing 184 by the axle segments 176 and 180 extending through openings (not shown) in the housing 184. The opposing axle segments 176 and 180 define the second lower axis 177. The end effector 128 includes a cylindrical tube 128a in which a central axle segment 186 is disposed. The central axle segment 186 is mounted within the lower gimbal ring 172 by any suitable means, e.g., bolts 186a extending through a bolt plate 186b. The central axle segment 186 may be non-rotational with respect to the lower gimbal ring 172, however, the cylindrical tube 128a, and thus the end effector, are rotatable about the central axle segment 186. The central axle segment 186 defines the first lower axis 190 which is substantially perpendicular to the second lower axis 177.

As best shown in FIG. 10, two L-shaped stand-off brackets 224 are shown attached, e.g., bolted, to the end effector 128 in two places. The L-shaped brackets extend under the central axle segment 186 and are shown attached to a square-shaped receptacle 220. The rigid connecting rod 212 is shown rotatably mounted within the receptacle 220 and retained therein by a pin 225 extending through the receptacle 220 and the L-shaped stand-off brackets 224 located on opposite sides of the receptacle 220. Likewise, the rigid connecting rod 216, which includes a trapezoidal head 216a, is shown rotatably mounted over the axle segment 186. As mentioned previously, at its upper end, the connecting rod 212 is connected to the upper outer ring 52, and at its upper end, the connecting rod 216 is connected to the upper gimbal ring 116. As best shown when comparing FIG. 10 and FIG. 11, as the boom 40 articulates, the connecting rod 212 will rotate. Through its connection to the upper outer ring 52, the connecting rod 212 will cause the end effector 128 to rotate about the axle segment 186 so as to maintain the end effector 128 substantially parallel to the upper outer ring 52.

I claim:

1. An industrial robot, comprising:
   a. a stationary base plate having a central opening;
   b. a ring structure arranged to receive an elongate boom;
   c. a parallel kinematics structure arranged between said stationary base plate and said ring structure providing movement of said ring structure in three dimensions while maintaining said ring structure substantially parallel to said stationary base plate;
   d. an upper gimbal ring mounted within said ring structure and pivotable about a first axis,
   e. said elongate boom comprising an upper end mounted within said ring structure and pivotable about a second axis, said second axis being substantially perpendicular to said first axis, said elongate boom having a length extending through the central opening of said stationary base plate to a lower end portion;
   f. a lower gimbal ring mounted within the lower end portion of said elongate boom and pivotable about a third axis;
   g. a first control linkage connecting said lower gimbal ring to said upper gimbal ring to maintain said lower gimbal ring substantially parallel to said upper gimbal ring during pivotal movement of said boom;
   h. an end effector arranged for carrying a tool and moving to different positions within a three-dimensional range of motion, said end effector mounted to said lower gimbal ring and pivotable about a fourth axis, said fourth axis being substantially perpendicular to said third axis;
   i. a second control linkage connecting said end effector to said ring structure to maintain said end effector substantially parallel to said ring structure regardless of the position of said end effector within said three-dimensional range of motion; and,
   j. wherein said upper gimbal ring additionally comprises an arcuate arm extending from a point along said second axis to a free end located at a point along said first axis, and wherein said lower gimbal ring additionally comprises an arcuate arm extending from a point along said third axis to a free end located at a point along said fourth axis, said first control linkage being connected to the free ends of said arcuate arms.

2. An industrial robot, comprising:
   a. a stationary base plate having a central opening;
   b. a ring structure arranged to receive an elongate boom;
   c. a parallel kinematics structure arranged between said stationary base plate and said ring structure providing movement of said ring structure in three dimensions while maintaining said ring structure substantially parallel to said stationary base plate;
   d. an upper gimbal ring mounted within said ring structure and pivotable about a first axis,
   e. said elongate boom comprising an upper end mounted within said ring structure and pivotable about a second axis, said second axis being substantially perpendicular to said first axis, said elongate boom having a length extending through the central opening of said stationary base plate to a lower end portion;
   f. a lower gimbal ring mounted within the lower end portion of said elongate boom and pivotable about a third axis;
   g. a first control linkage connecting said lower gimbal ring to said upper gimbal ring to maintain said lower gimbal ring substantially parallel to said upper gimbal ring during pivotal movement of said boom;
   h. an end effector arranged for carrying a tool and moving to different positions within a three-dimensional range of motion, said end effector mounted to said lower gimbal ring and pivotable about a fourth axis, said fourth axis being substantially perpendicular to said third axis;
   i. a second control linkage connecting said end effector to said ring structure to maintain said end effector substantially parallel to said ring structure regardless of the position of said end effector within said three-dimensional range of motion;
   j. wherein said upper gimbal ring additionally comprises an arcuate arm extending from a point along said second axis to a free end located at a point along said first axis, and wherein said lower gimbal ring additionally comprises an arcuate arm extending from a point along said third axis to a free end located at a point along said fourth axis, said first control linkage being connected to the free ends of said arcuate arms; and,
   k. wherein said upper ring structure additionally comprises an arcuate arm extending from a point along said first axis to a free end located at a point along said second axis, and wherein said end effector additionally comprises an arcuate arm extending arcuately from a point along said fourth axis to a free end located at a point along said third axis, said second control linkage being connected to the free ends of said arcuate arms.

\* \* \* \* \*